US006973437B1

United States Patent
Olewicz et al.

(10) Patent No.: US 6,973,437 B1
(45) Date of Patent: Dec. 6, 2005

(54) COMPUTER INTEGRATED COMMUNICATION SYSTEM FOR RESTAURANTS

(76) Inventors: Tadeusz A. Olewicz, 1545 Smoke Hill Dr., Hoschton, GA (US) 30548; Michael Pate, 5233 Pine Branch Cir., Sugar Hill, GA (US) 30518

( * ) Notice: Subject to any disclaimer, the term of this patent is extended or adjusted under 35 U.S.C. 154(b) by 757 days.

(21) Appl. No.: 09/605,077

(22) Filed: Jun. 28, 2000

Related U.S. Application Data

(60) Provisional application No. 60/141,446, filed on Jun. 9, 1999.

(51) Int. Cl.[7] .............................................. G06F 17/60
(52) U.S. Cl. ....................................................... 705/15
(58) Field of Search .............................. 705/15, 16, 21, 705/17, 18

(56) References Cited

U.S. PATENT DOCUMENTS

| | | | | |
|---|---|---|---|---|
| 3,267,436 A | * | 8/1966 | Albert et al. .................. | 705/15 |
| 3,304,416 A | * | 2/1967 | Wolf ........................... | 377/13 |
| 3,310,797 A | * | 3/1967 | Auger ................... | 340/286.09 |
| 3,714,410 A | | 1/1973 | Olsen ......................... | 240/6.4 |
| 3,821,707 A | | 6/1974 | Peters ......................... | 340/171 |
| 4,074,793 A | * | 2/1978 | Yuter ........................... | 186/38 |

(Continued)

OTHER PUBLICATIONS

White, Ron, How Computers Work, Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*
"Tools of the Trade: Technology in the Restaurant", *Restaurants USA Magazine*, Sep. 1997.

*Primary Examiner*—Andrew J. Fischer

(57) ABSTRACT

A computer integrated communication system for restaurants that includes a central server and a series of table units and staff units. The table and staff units each include a display and wireless communication device that enables customer request information and other communications to be sent from the table unit to the staff units either directly or by first being passed through the central server unit. The central server further can monitor the communications and direct the request to another staff member or management for action in the event of delays or other problems with the customer's request.

8 Claims, 13 Drawing Sheets

U.S. PATENT DOCUMENTS

| | | | | |
|---|---|---|---|---|
| 4,128,757 A | * | 12/1978 | Garner, Jr. | 235/383 |
| 4,222,111 A | | 9/1980 | Sloan et al. | 340/286.09 |
| 4,250,491 A | | 2/1981 | Dotson | 340/321 |
| 4,388,689 A | * | 6/1983 | Hayman et al. | 705/15 |
| 4,415,065 A | * | 11/1983 | Sandstedt | 705/34 |
| 4,530,067 A | * | 7/1985 | Dorr | 705/15 |
| 4,547,851 A | | 10/1985 | Kurland | 705/15 |
| 4,553,222 A | * | 11/1985 | Kurland et al. | 705/15 |
| 4,569,421 A | * | 2/1986 | Sandstedt | 186/39 |
| 4,582,172 A | | 4/1986 | Takeuchi et al. | 186/38 |
| 4,701,849 A | * | 10/1987 | Elden | 705/11 |
| 4,722,053 A | * | 1/1988 | Dubno et al. | 463/42 |
| 4,777,488 A | | 10/1988 | Carlman, Jr. et al. | 340/825.72 |
| 4,800,438 A | * | 1/1989 | Yuter | 348/836 |
| 4,935,720 A | * | 6/1990 | Kalfoun | 340/286.09 |
| 5,003,472 A | * | 3/1991 | Perrill et al. | 705/15 |
| 5,018,066 A | | 5/1991 | Yagi | 705/21 |
| 5,128,862 A | * | 7/1992 | Mueller | 705/15 |
| 5,262,938 A | * | 11/1993 | Rapoport et al. | 705/15 |
| 5,272,474 A | * | 12/1993 | Hilliard | 340/825.29 |
| D349,071 S | | 7/1994 | Fields et al. | D10/114 |
| 5,355,115 A | | 10/1994 | Goor et al. | 340/321 |
| 5,489,887 A | | 2/1996 | Porras | 340/332 |
| 5,504,589 A | * | 4/1996 | Montague et al. | 358/403 |
| 5,594,409 A | | 1/1997 | Shank | 340/326 |
| 5,602,730 A | * | 2/1997 | Coleman et al. | 705/15 |
| 5,699,039 A | | 12/1997 | Korzen | 340/311.2 |
| 5,828,294 A | | 10/1998 | Shank | 340/326 |
| 5,838,798 A | * | 11/1998 | Stevens, III | 705/21 |
| 5,839,115 A | * | 11/1998 | Coleman | 705/15 |
| 5,845,263 A | * | 12/1998 | Camaisa et al. | 705/27 |
| 6,019,393 A | * | 2/2000 | Loebner | 283/60.2 |
| 6,088,681 A | * | 7/2000 | Coleman et al. | 705/15 |
| 6,208,976 B1 | | 3/2001 | Kinebuchi et al. | 705/15 |
| 6,366,196 B1 | * | 4/2002 | Green et al. | 340/286.09 |
| 6,580,360 B1 | | 6/2003 | McKee et al. | 340/286.09 |
| 2001/0047301 A1 | * | 11/2001 | Walker et al. | 705/15 |
| 2002/0032667 A1 | * | 3/2002 | Walker et al. | 705/400 |
| 2002/0077843 A1 | | 6/2002 | Halverson | 705/1 |
| 2003/0088469 A1 | * | 5/2003 | Leifer | 705/15 |

* cited by examiner

COMPUTER INTEGRATED COMMUNICATION SYSTEM FOR RESTAURANTS

CROSS REFERENCE TO RELATED APPLICATIONS

This application claims priority to U.S. provisional application Serial No. 60/141446, filed Jun. 9, 1999.

FIELD OF INVENTION

The present invention generally relates to communication systems and more specifically to a computer integrated communication system for restaurants to enable enhanced communication between customers and the restaurant waitstaff and management.

BACKGROUND OF INVENTION

Customer service is a particular concern in the restaurant industry where competition for customers is tight. Poor service or repeated problems can lead to an unpleasant dining experience, resulting in the loss of business and the development of a poor reputation for the restaurant. One of the primary causes of many service problems is the inability of patrons to quickly and easily communicate with their waiter/waitress or manager, especially when the restaurant is busy, or, when due to lack of staffing or other problems, a waiter or waitress has responsibility for tables in different areas of the restaurant, possibly on opposite ends of the restaurant. As a result, waiters and waitresses can get too busy to monitor each of their tables on a regular basis. In addition, difficult or demanding customers who monopolize a large portion of the waiter or waitress' time further compound this problem. As a consequence, patrons will be frustrated with their inability to contact and communicate with their waiter or waitress for even simple requests such as drink refills. Such frustrations lead to dissatisfaction on the part of the customer, which at times requires the intervention of the manager to try to salvage the situation and placate the dissatisfied customers such as by offering free food or "comping" all or part of the customers meal.

Most restaurants further inherently operate inefficiently as a result of the necessity for the wait-staff having to spend much of their time gathering and distributing information. For example, waiters repeatedly visit tables to ask if the customers have any requests, if they are ready to order, ready for their check, to advise them how their order is progressing, etc. The wait-staff typically takes and records the customer's orders on paper, after which orders are then walked to the kitchen or central services stand for input to the cooking staff. In more technologically advanced restaurants, computers are used to keep track of orders and inventory. But even in these cases there are many inefficiencies. For example, most waiters generally still take the orders using a pad and pen, after which they walk over to the data entry device, such as a PC, to enter the order into the restaurant computer system. Such a method of order taking is still inefficient and results in occasional order errors. Furthermore, the cooking staff has no effective way to inform the waiter that an order has been prepared and is ready to serve. Thus orders generally must sit and wait until the waiter comes into the kitchen to check the order. These delays extend the time that customers spend at the restaurant and prevent the restaurant from using the table to serve new customers.

Restaurants additionally lack accurate operational data to guide management for making decisions. Presently, the industry does not appear to have an integrated system to collect data concerning customer satisfaction, inventory levels, available seating wait times, employee performance and general information concerning the operation of the restaurant. For example, restaurants presently collect customer satisfaction information by asking customers to fill out response cards at the table or contracting with a firm to call customers at home. Both of these methods have problems. If the customer completes the response card at the table, it will then need to be reviewed and processed to generate statistical information that will be useful to the restaurants management. If the customer satisfaction information is gathered later by calling the customers, the information becomes less precise because significant time has elapsed between the dining experience and the gathering of the data.

Restaurants thus, generally lack a good way of measuring employee performance, particularly in restaurants staffed by young people with little work experience, leaving some employees to pull more than their share of the workload, while others are under performing. If an employee is providing poor service or has a bad attitude, it may go unnoticed by management. This can cost restaurants a loss of customers who may choose to never visit the restaurant again rather than report the problem to a manager. Similarly, the inability to accurately determine how fast tables are being turned, poses a problem for restaurants. Quite often, all the available seats in a restaurant will be occupied and customers put on a waiting list, with the hostess or manager being left to guess as to the wait times. If wait times are overestimated, the restaurant may lose business from customers perceiving the wait to be too long and leaving. If the time is underestimated the customer becomes frustrated by waiting longer than the estimated time.

Restaurants also need ways to better tailor advertisements to their customer. Most advertisements that are used presently, generally are somewhat generic in nature and tend to be less effective than advertisements that designed to fit the customer. For example, restaurants typically use point-of-sale signs or cards provided by the vendor to advertise beer or other alcoholic beverages, which ads typically have little, or possibly a negative effect, on customers with children who are visiting at breakfast or lunch. Furthermore, most advertisements are not timed to correspond with the purchasing choices being made, but instead are static and cannot be easily changed to fit the customer(s). For instance, restaurants often place cards on the table showing the special meals of the day. This advertisement becomes useless after the customer has placed their food order, whereupon the restaurant needs to promote the sale of deserts or drinks.

Accordingly, it can be seen that the need exists for an integrated system that streamlines communications between workers, provides accurate real time information, enables the delivery of tailored and timely advertisements and improves customer satisfaction.

SUMMARY OF THE INVENTION

The present invention generally relates to a computer aided communication system for use in restaurants and other business environments, such as nightclubs or other areas where communication between customers and business staff is critical for compiling real time data and for tailoring advertisements to customers and time of day for improving customer service. The present invention in use in a restaurant, for example, includes a central server unit or main data collecting and transmitting unit generally includes a conventional PC or processing unit with a display, memory, including a backup memory, and a keyboard or similar data input mechanism. The central server unit typically is positioned in the manager's office or can be placed on the floor of the restaurant, at the front of the restaurant or at the hostess stand. Additional terminals that are constantly updated can be positioned throughout the restaurant to enable the hostess or manager to constantly monitor wait times, service calls or other information, as needed. The central server unit will store information that is gathered in the restaurant and use this information to make complex decisions and aid the restaurant staff in making well-informed decisions.

A series of table units can be mounted on customer tables, and typically at the bar of the restaurant. Each table unit includes a power supply, short-range wireless communication capability and a display capable of displaying customer service choices, advertisements and feedback request information. This feature will provide additional sales for the restaurant and can be used to generate revenue by selling advertisement space on the table unit to other businesses, For example, advertisement space can be sold to other local businesses who would use that space to invite customers to visit their business after dinner. The table unit will also be in constant communication with the central server unit and the advertisements can be timed to coincide with the meals level of completion. The table unit further can include a credit card reader that facilitates the customer in paying their bill without the aid of the restaurant staff.

The system will also include a series of staff communication units such as wait staff or waiter, manager, kitchen and cleanup units, having short range wireless communication capability such as a pager or Palm sized computer, that can be carried on waiters belts or incorporated into an order pad to be used to record customer orders. Each of the waiter, clean up and manager monitoring units generally will be capable of communicating with the central server unit or directly with a table unit or series of table units. Additionally, a Hostess Unit will be positioned at or near the front of the restaurant and will communicate by wire or wirelessly with the central server unit. The hostess unit typically will be a stand alone PC or a networked computer with display monitor and data input mechanism. It can also include a "dumb terminal" or simply a display monitor. Similarly, the kitchen unit will be positioned in the kitchen to provide order information to the cooking staff and generally will comprise a computer with display monitor or a printer and an input device such as a touch screen or keyboard. The hostess and kitchen units display order and table seating information provided by the central server unit and provide a means for updating the central server database as orders are filled and tables are opened/cleared.

Typically, when a request is sent from a table unit, it is received by the central server, which processes the request and sends it out to the appropriate waiter responsible for that table or series of tables, or to a manager if requested, according to the table unit identification code. The waiter then receives a page telling him, for example, Table 1 needs a refill of drinks. Additional communications/requests are organized in a queue, from first to last, and if necessary can be marked as urgent. The waiter can scroll through multiple pages and take care of the most urgent requests as expeditiously as possible. As each request is completed, the waiter can delete the page, sending a corresponding signal back to the central server to indicate that the server's condition has been processed. The central server generally can monitor the time between the pages being sent and the request being completed by the waiter(s) and, after a certain time, advise a manager of a delay in completing the service request.

In the further operation of the invention, the hostess unit will serve several functions, including providing accurate seating availability and wait times for customers arriving at the restaurant based on statistical data such as the level of meal completion at tables, amount of staff and workloads, the type of food being cooked, time of day and other information that affects table turnover. The hostess unit also can be used to check new customers into the system, by having the Hostess enter data about the customer such as number of customers, gender of customers, and approximate age to form a statistical database. This database will be used to form statistical profiles for advertisements and to aid management in understanding the restaurant's customer base. Depending on the type of group the customer falls in, advertisements shown on the table unit can be tailored accordingly to the profile for such customers. The effectiveness of the advertisements thereafter can be tracked or measured by reviewing the central computer records what was advertised and what was purchased. This information can be used to refine the advertisements and build a valuable statistical database. Such advertisements typically will also be interactive, to enable customers to access more information about the products/services offered as desired.

The effectiveness of the system is increased with the integration of the component units to be in communication with the central server, which makes it possible for the different units to share information and for the central server to use data to make intelligent decisions and aid in the restaurant's staffs decisions. It is also possible to have stand-alone units (i.e., table unit) designed to communicate only with a further designated unit such as a waiter unit. Such stand-alone units can be used where a more limited system is desired by the restaurant.

Various features, objects and advantages of the present invention will become apparent to those skilled in the art upon reading the following detailed description when taken in conjunction with the accompanying drawings.

DETAILED DESCRIPTION

Figure 1:
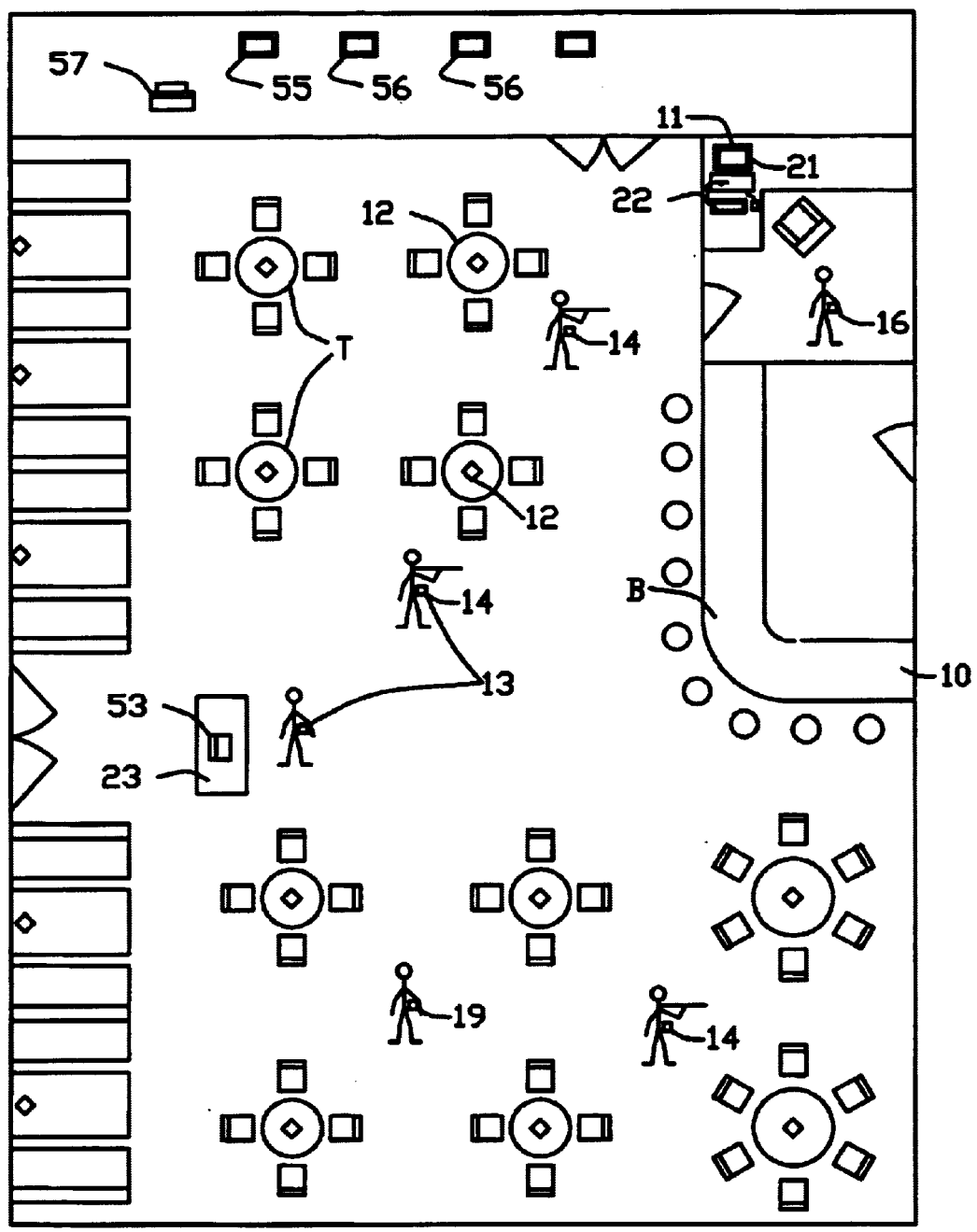
FIG. 1 illustrates an example restaurant layout in which the restaurant communication system of the present invention is used.

Referring now to the drawings in which like numerals indicate like parts throughout the several views, FIG. 1 generally illustrates an exemplary restaurant layout in which the computer aided restaurant communication system 10 of the present invention can be used. It will be understood, however, by those skilled in the art that the restaurant communication system 10 of the present invention can also be used in various other restaurant layouts or designs, as well as also can be used in various other business environments such as nightclubs, stores, or other areas where quick, direct and accurate communication between customers and business staff is critical. In addition, the system is designed to provide accurate real-time data needed to make quick, well informed decisions, and to enable tailored and timely advertisements to be directed to customers at their tables or at point-of-purchase displays to enable direct feedback or requests from the customers or patrons to the business staff of the establishment.

Figure 2:
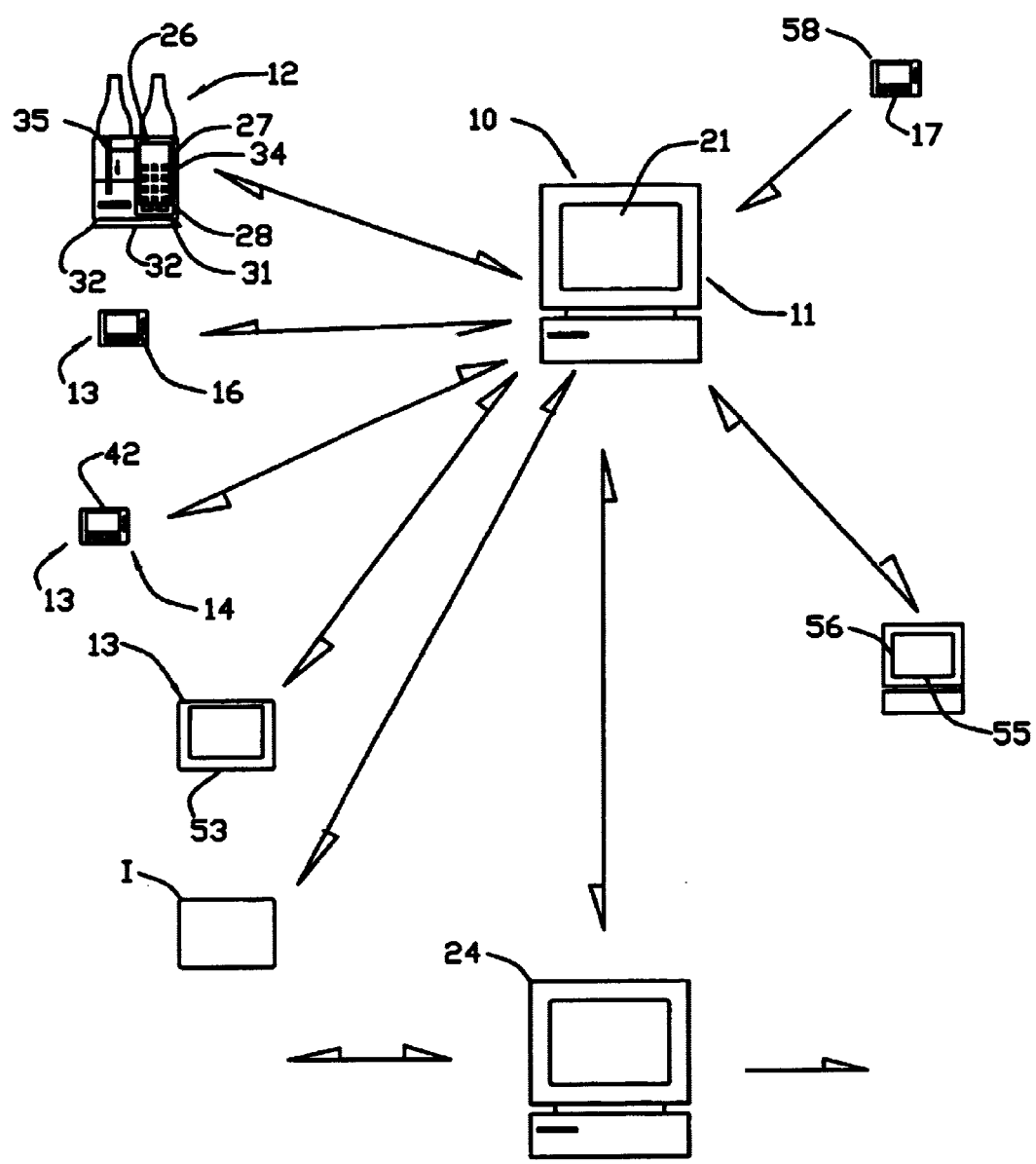
FIG. 2 is a schematic illustration of the communication between the various components of the restaurant communication system and the central server.

As illustrated in FIG. 1, for use of the communication system in a restaurant, for example, the system 10 generally will include a central server unit 11, typically mounted in a backroom or office area, which serves as the central receiver and processor of information as indicated in FIG. 2 for sending out instructions and communication request to a series of table units 12 that are mounted at each table T (FIG. 1) or at a booth or along a bar area B, and to a series of staff communication units 13, including wait staff, manager and cleanup units 14, 16 and 17, respectively.

As indicated in FIGS. 1 and 2, the central server unit functions as the communications hub, and the data collection storage device, such as an Apple Imac, IBM PC or similar computer/central processing unit. Typically it will comprise a standard personal computer with microprocessor and memory, and memory backup and modem, with database software, such as Oracle database, to store transmittal information. The central server unit 11 will also typically include a monitor 21 (FIG. 1), keyboard, touch screen, or other input device 22 for input of information, and a printer for reports, as well as a communication unit/devices such as an infrared amplifier, a repeater, an RF converter and/or an RF input card for the central server unit. The central server unit 11 can be located in a manager's office or can be on the floor at a hostess/wait stand, and/or an additional monitor 23 can be placed at the hostess stand, or other easily accessible location.

The central server unit will receive all customer requests, time stamp them and log them into a database. It will send the request to the appropriate waiter. If the request becomes overdue, it will warn the waiter that the request needs immediate attention. The waiter will be given a little more time to perform the service. If the service is still not performed, it will send the request to the floor manager's communication unit. The central server unit will also handle any transfers requests. If the request is coming from the waiter, it will be first sent to the managers communication unit with an indicator that tells the manager that this request is only a transfer and not an overdue service. If the request is coming from the Manager's communication unit, the central server unit will recognize it, and make a logical decision to transfer the request to another waiter with lowest number of calls, and who is the closest one to the waiter that needs assistance. The Daily specials also can be entered on the central server unit and wirelessly send out to all the table units. Also, the central server unit can post wait times, etc., to an Internet website "I"(FIG. 2) and can take reservations/put customers on a wait list.

The central server unit will use the database of the requests to chart trends, supply the restaurant manager(s) with data such as waiter performance, the area of restaurant with most problems, what days of the week and times of the day have the most problems, etc. This information will help the managers to more efficiently staff the restaurant, and improve performance of the establishment. The central server unit will also collect the survey information, which will allow managers to make more informed changes and modifications to improve service or food in their restaurants.

In other embodiments, the central server unit can be at an offsite location and, in some instances, such as in the case of a chain type restaurant, the central server unit will be connected to a remote server 24 (FIG. 2). This server will in turn be connected to the World Wide Web. The Remote Server will collect the data from all, and give the owners real time data about the performance of each restaurant in the chain. This information will be invaluable in making strategic decisions such as; how to improve quality, performance, profitability, and where to best build more restaurants.

Figure 5:
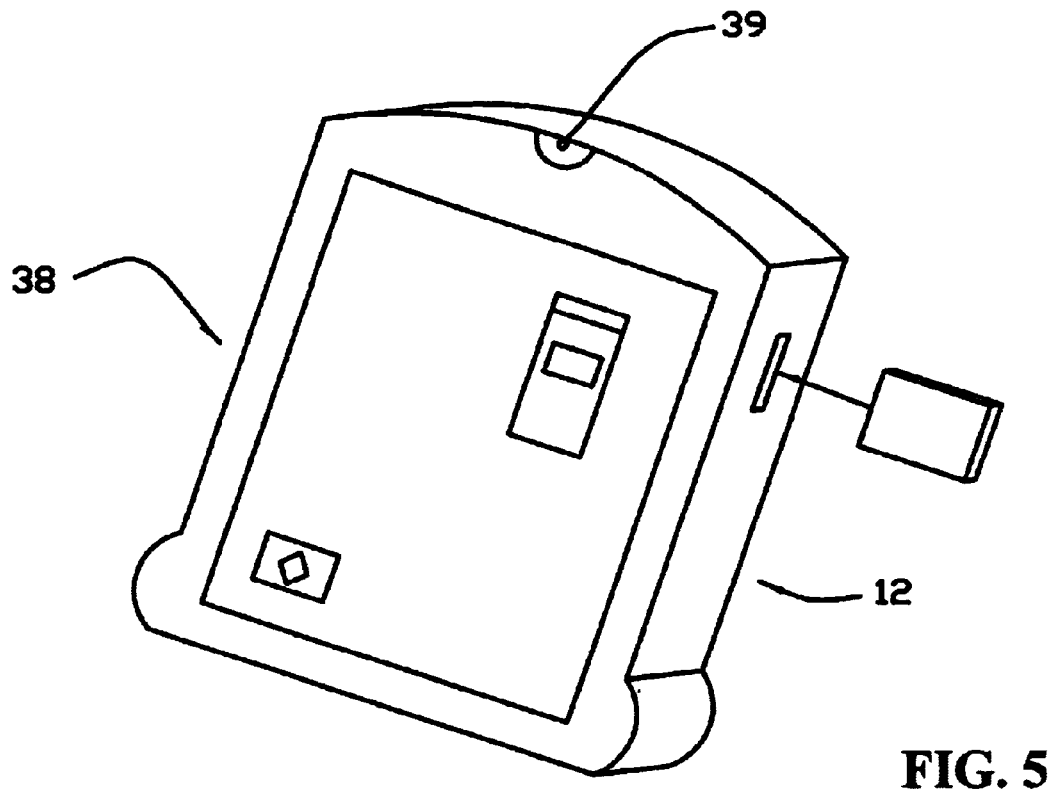
FIG. 5 is a perspective view of an additional embodiment of the table unit of the restaurant communication system.
Figure 3:
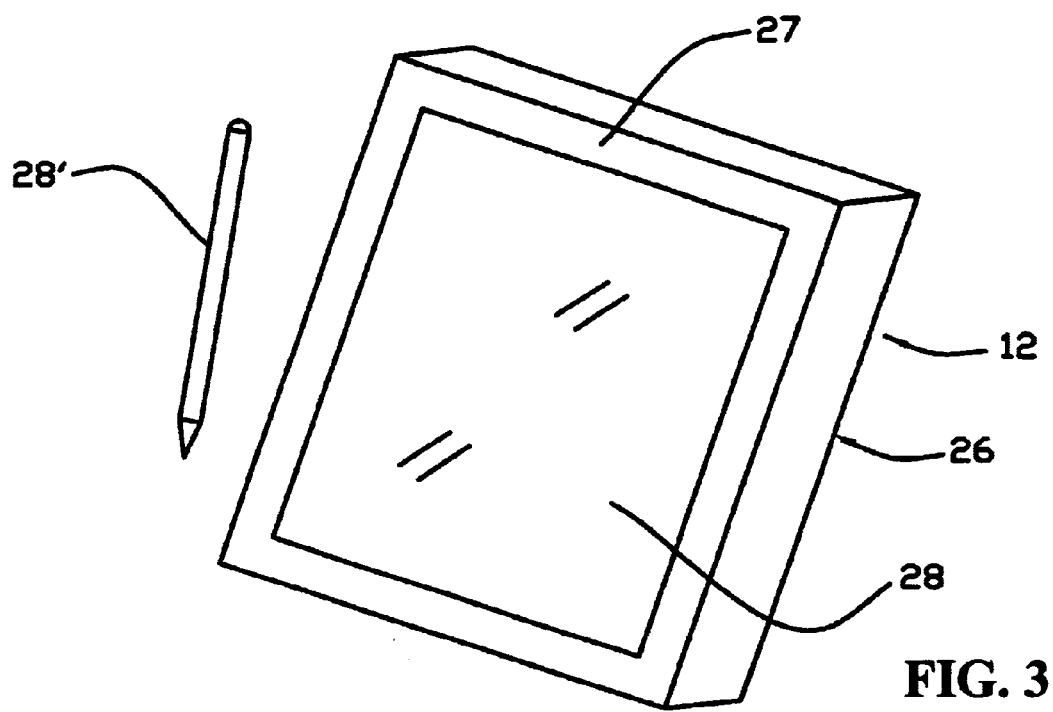
FIG. 3 is a side elevational view of the table unit of the present invention.

As shown in FIGS. 3–5, the table units each generally comprise a compact computer 26 with a communication unit or device built in so as to have the ability to communicate via infrared, radio frequency, direct wiring, or cellular transmissions with other communication units, such as PC's, printers and other type peripheral devices. An example of this type of unit could be a "3COM Palm Pilot", "H P Jornada", "MAXTECH PD-910)" or "CASIO Cassiopeia" having a display such as a LCD screen 27. The Communication Unit will also include an input mechanism 28 such as touch screen, pen stylus 28', keypad, voice, or other similar mechanism. Typically, the table communication unit will have the ability to communicate with the waiter, kitchen, hostess, manager and other units. Communications coming from the table unit will be routed through the central server unit. The central server unit in turn will log and time stamp the request or data, make a decision if necessary, and forward it to the appropriate destination.

Figure 4C:
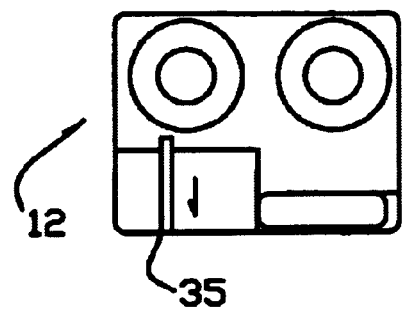
FIG. 4C is a plan view of the table unit of FIG. 4A.
Figure 4A:
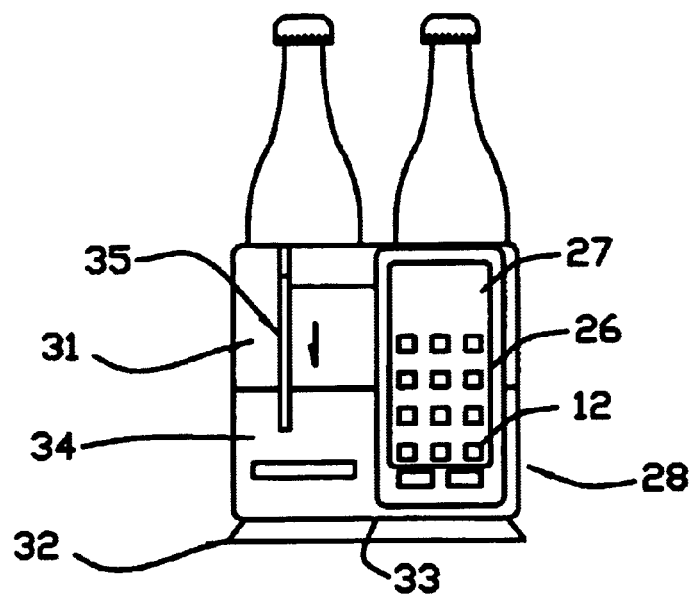
FIG. 4A is an end view illustrating the table unit in a decorative or ornamental arrangement.
Figure 4B:
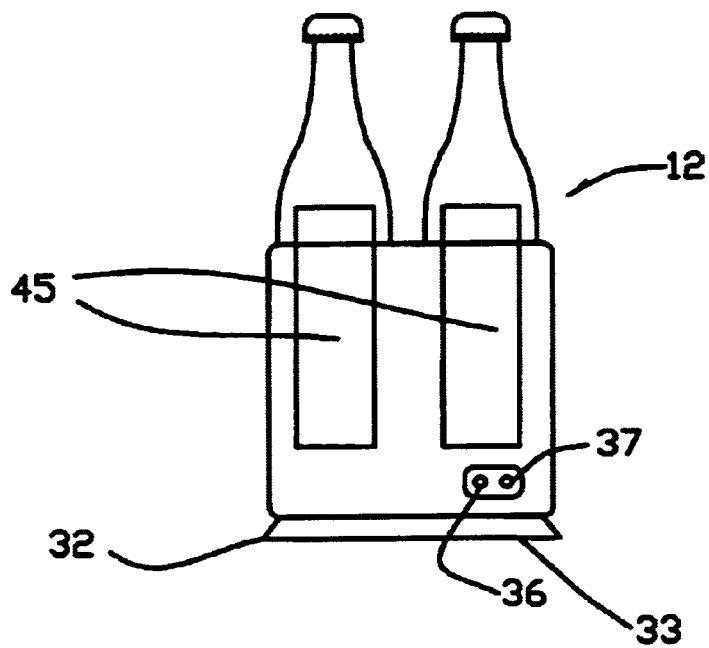
FIG. 4B is an end view of the opposite end of the table unit of FIG. 4A.

In a further exemplary embodiment shown in FIGS. 4A-C, the table unit 12 can be designed with a decorative outer housing or configuration, to blend into the decor of a restaurant or bar. For example, the overall external appearance of the table unit further can be changed and designed to match the style or preference of the restaurant, the sponsor(s) or advertiser(s). For instance, if the table unit is sponsored by a company, such as Coca-Cola or Budweiser, the external appearance of the table unit could be designed to look like a Coke bottle or "six pack" of bottles as shown in FIGS. 4A–4C.

As shown in FIGS. 4A–C, the housing 31 generally includes a base mounting plate 32 that generally will include a metal or plastic plate 33 that will be permanently or semi-permanently mounted to the table or booth. Typically, the base mounting plate 32 is mounted to the table by clamping, magnetically coupling, gluing, using fasteners like screws or rivets, or other fastening method, where the choice of the method will highly depend on construction of the table or booth. A base unit 34 is secured to the base mounting plate in a manner such that it can be rotated to face any direction, and be easily removed for repair, replacement, or cleaning. This base unit generally serves as a docking cradle for the computer/communication unit 26, and connects a power source used to charge the communication unit. Typically the unit 26 will not be permanently attached to the base unit so as to allow the computer/communication unit 26 to be easily removed from the base unit, and conveniently placed somewhere near one of the customers. In some cases the computer/communication unit 26 can be designed to be an integral part of the base unit, for example, if the tables or booths are small, and the base unit can be easily reached by any customer sitting around the table or booth. In addition, a credit card reader 35 or swipe device for reading a customer's credit card to enable customers to pay for services at the table itself.

A power source 36 (FIG. 4B) is housed in the base unit will preferably be in the form of a long life (i.e., 24 hour minimum life), high capacity rechargeable battery(s) 45 or battery pack, such as used in camcorders, industrial power tools, drills, etc. The battery pack will typically consist of one or more such batteries and used to recharge the battery inside the communication unit. The battery pack can further be designed such that if the main charging battery starts to go low, a second battery takes over, and the communication unit will inform the central server unit that its recharging battery is getting low. This feature will give the waiters plenty of time to replace the low battery at their convenience, with plenty of time to spare before the restaurant opens for business the next day, or at the end of the day before the restaurant closes. A reasonable number of the power batteries further typically will always be on charge in a dedicated location in the restaurant. The base unit generally will also have a plug-in option or a connector or charging port 37 (FIG. 4B), so it can be plugged in directly into a 120 VAC outlet via a power jack connection (primarily in case of booths) for its power supply, or for recharging its battery pack.

The table communication unit generally will be programmed typically with the following functions:

| | |
|---|---|
| #1 function - | Ready to order |
| #2 function - | Drinks refill |
| #3 function - | Waiter needed |
| #4 function - | Show today's specials |
| #5 function - | Show total bill |
| #6 function - | Ready to pay the bill by cash |
| #7 function - | Charge the bill |
| #8 function - | Tip amount select (i.e., 15% or 20%) |
| #9 function - | Print total bill |
| #10 function - | Need manager |
| #11 function - | Child lock |
| #12 function - | Take a survey and possibly receive a discount on the bill |
| #13 function - | Entertainment - games, jokes, movies played in local cinemas (possibly even ticket purchasing option if the cinema is affiliated with the particular restaurant), etc. |
| #14 function - | Advertisements, Display (default) / Do not display. As advertisements will be designed not to bore or annoy the customers but to entertain and humor. |
| ENTER button - | Before request will be processed, the enter button must be pressed to acknowledge the request, this feature will prevent most incidental calls. |
| CANCEL button - | this button will be used in case the service is no longer need, or it has been taken care of by someone else. Also if the child lock is off and a child makes an accidental call, the parent or guardian can cancel the call before the call is answered by the waiter. |

Each button (function) generally will be clearly labeled in English and/or other selected, preprogrammed language of choice. Once a button is pressed or selected, the screen will display what the button will do, letting the customer get familiar with the function before he/she makes the actual selection.

In a first embodiment, table unit 12, as shown in FIG. 3 can have a programmable type touch screen display, where the selections can be made by use of a finger, a pen type stylus, or similar means. In addition the communication unit will have the ability to send voice messages utilizing MP3, WAV, or other file. This type of versatile communication unit will provide programmable functions and much greater communication options, including ability to send more detailed messages. For instance, when requesting a drink the customer by using the voice message option, can specify the type of drink that needs to be refilled, which will enable the waiter to bring the correct drink on the first trip instead of making two trips. This type of device will be user friendly, easy to use and will result in the optimum communication efficiency between the customer and the waiter.

In an additional embodiment of the table unit 12, the communication unit can be a standard type alphanumeric pager, a cell phone, or other similar low cost communication device. In this case some functions described above in the full-featured embodiment unit may not be available. The table unit will also have an optional charge card payment unit 35, with a built in printer to print out customer receipts. This feature will allow the customers to pay the bill, get the receipt, and leave without having to wait for the waiter to perform the transaction. This will not only save time for the customer, but it will also free up the table sooner, which in turn will help the restaurant to do more business.

In still a further embodiment of the table unit as illustrated in FIG. 5, the table unit can include a personal computing unit 38, such as the "QBE" computing tablet manufactured by Aqcess Technologies, Inc., which includes a processor and memory, as well as an integral display as an XGA active matrix color display screen that can be a touch screen, or can include a pen stylus, mouse or other input mechanism for entering customer information therein. The computing tablet further can include a smart card, read/write magnetic strip reader for reading credit card information, and a built-in video link or camera 39. The tablet can be mounted directly on the customer's table or booth and can be power by a rechargeable battery pack or can be connected directly to a VAC power outlet for directly powering the tablet. In addition, the monitor can be formed as a touch screen so as to enable input of data directly in the unit through the touch screen.

Figure 6A:
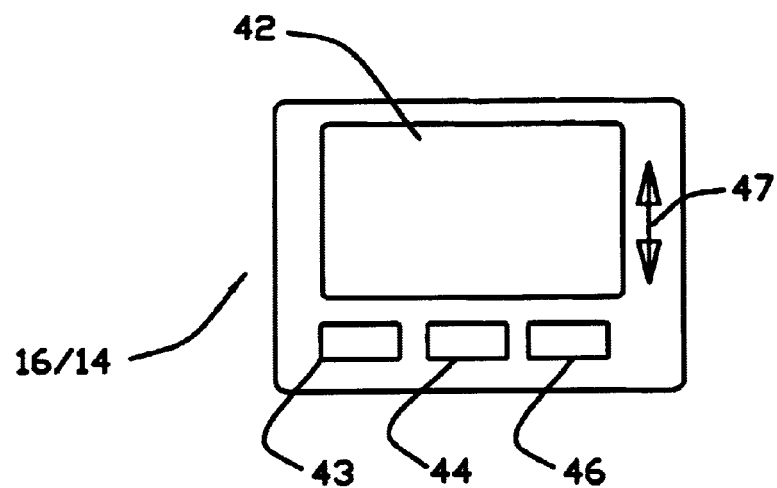
FIGS. 6A–B are side elevational views illustrating embodiments of the staff communication unit.
Figure 6B:
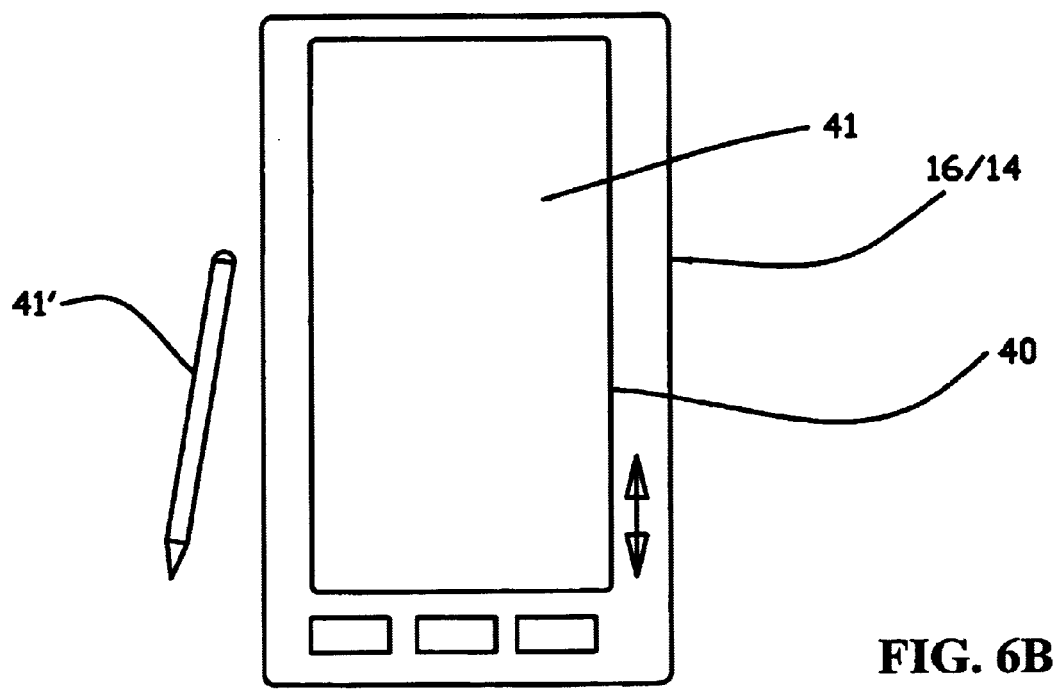

As shown in FIGS. 6A-6B, the staff communication units 13 of the waitstaff and manager 16 generally will comprise a hand held computer 40, possibly same or similar to the one used as the table communication unit, for example a "Palm Pilot" or Cassiopeia. The unit will include an input mechanism 41 such as touch screen, pen stylus 41', voice input, light pen, alphanumeric key pad or other input mechanism having features, which will allow information, such as an order taken by a water unit 14 (FIG. 2), to be taken and transmitted electronically. For example, this type of unit will not only allow the waiter to take but also send order electronically to the kitchen's printer or display, so the cooks can immediately begin food preparation. Typically, each of the staff communication units will also have the ability to communicate through the central server unit with the hostess, manager, other waiter units, kitchen and/or cleanup units, or can just send data to the central server unit.

Typically, the wait staff unit 14 (FIGS. 6A-6B) will generally have at least seven main functions: take order, customer request queue (default function), table ready to clean, waiter ID, Enter, ,Cancel and Up/Down Scroll. These functions will allow the waiter to select the type of activity he/she desires to perform. Each of these functions will potentially have sub-functions. The description of each function is as follows:

1 function

Take Order function: displays restaurant's menu and specials. Using the touch screen/stylus pen type interface the waiter will be able to easily take orders and forward them directly to the kitchen. Since the order will go through the central server unit, which has the information about the inventory, waiter will know immediately after sending the order if the food ordered is still available. If the food is not available, the computer will send the order back to the waiter instead to the kitchen, and allow the waiter to retake the order and send it again.

The order will contain the table # information and the waiter ID, so when the order is prepared, the kitchen unit can inform the waiter. This function will also greatly streamline the information transfer between waiter, central server unit, and the kitchen, and reduce the errors during double order entry, which often occur when using existing methods. Since the waiter can simply send the order to the kitchen when he is done taking it, he/she can immediately proceed to take another order, or take care of a customer request. This ability will make the waiter much more efficient and less fatigued. Using this system, the efficiency of one waiter will be increased to the point where fewer waiters are required in a restaurant.

2 function

Customer request queue: at any time waiter will be able to display customer request list, which will be sequentially queued in the order, which the request came in. Each customer request entry will at least show the following information: the type of request, the urgency, the time elapsed since the request came in. When the request is within certain time of being overdue, the request will start flashing, or be otherwise tagged for predetermined amount of time before it will be send to the manager's unit. If the waiter determines that he/she will not be able to satisfy the request, he/she will still have enough time either to transfer the request to another waiter's unit, or manager's unit before it becomes overdue.

Sub-function #1

The customer request Transfer: this function will be used in case the waiter can not perform the service and his request needs to be performed by someone else. When this button is pressed, the highlighted or otherwise indicated request will be transferred to the central server unit, which in turn will send the request to the floor manager. The manager can then take care of the request himself, or transfer it back to the central server unit. The computer will then make a logical choice, to transfer the request to another waiter that has low number of calls and that is the closest to the waiter that needs help. There may even be a system where waiters will work as teams of two or more, and the computer will select a team member to take care of the transferred request.

3 function

The Enter function: which will allow the waiter to confirm his/her selection or entry before it is sent to the central server unit to be processed. This button will help avoid accidental button depression, and provide the way for the waiter to acknowledge his/her selection.

4 function

The Cancel function: this function/button cancels any highlighted, or otherwise indicated display selection, such as: food order, customer request, or other.

5 function

The Up/Down Scroll: this will allow the waiter to scroll up and down the selected lists such as: consumer requests, food orders, or other.

6 function

Table ready to clean: this function will allow the waiter to communicate with the cleanup personnel and inform them that the particular table is ready to be cleaned.

7 function

Waiter ID: this function will inform the central server unit who is operating the unit.

When a customer requests a service, the central server unit will receive the call, log it in, stamp it with time of the request, and transfer it to the appropriate waiter. The Waiter Unit will receive it, and the unit will display it in the order it came in. The use the full featured waiter communication unit will not only significantly speed up the order preparation, but eliminate double input of the order into the computer for billing, and free up the waiter to perform other duties, making him/her more efficient. All the above benefits will directly increase the table turnover, which is directly proportional to the profits.

In an additional embodiment as shown in FIG. 6B, the waiter communication unit 14 can include a standard type pager 42, or a cell phone type communication device generally including control buttons such as "cancel", "enter", "send" and "up/down scroll" buttons 43, 44, 46 and 47. These type devices will limit some of the functions.

The manager communication unit 16 (FIG. 2) generally will be similar to and will function basically the same as the waiter communication unit 14, with few programming differences. The central server unit will send messages to the manager communication unit concerning overdue requests, or messages specifically for the manager. the display, the enter, cancel, and scroll buttons of this unit will function the same as described in the waiter communication section above, but the transfer button from this unit will trigger different central server action. The transfer button, followed by the enter button, will cause the selected request to be sent to the central server unit. The central server unit 11 in turn will make a logical decision to transfer the request to another waiter with lower number of calls, and who is the closest one to the waiter that needs assistance.

Typically, the hostess stand will be equipped with a hostess communication unit 53. The unit generally will be in form of a portable computer, such as a notebook type PC computer such as a "Dell Inspiron 3200", or similar device. This unit will have at least four functions: 1. display the graphical representation of the restaurant layout showing which tables are clean and ready, 2. tag the table as busy before ushering the party to the table, 3. based on statistical data, party size, and real time restaurant information, the central server unit will advise the hostess regarding the wait times, 4. log customer names along with party size and party profile, recorded in order to prepare custom tailored advertisement to be displayed on the table unit occupied by that party during the meal. The hostess unit will be in constant communication with the central server unit, so all the data will be current. In addition the hostess unit can include an already existing coaster call or pager system (made by Coaster Call Co.) as known in the art, used to inform waiting customers that their table is ready. Further, the hostesses can also carry pager units themselves.

The system will also include a kitchen communication unit 55 (FIG. 2) generally consisting of monitors 56 and/or printers 57 for receiving incoming orders and with at least one communication device such as an RF or infrared communication device, or can route its information through the central server unit to communicate directly with the wait staff and/or manager(s). The monitors and/or printers will be used to display or provide a hard copy of the orders send by the waiters. This communication unit also sends its information through the central server unit, so all the data about when the order was received, and when it was ready to be served will be collected by the server.

The kitchen unit similarly communicates with the central server to inform the cooking staff of the orders being taken by the waiters and likewise filled by the cooking staff on a real time basis. When the waiter takes an order from the customer, the order is sent to the central server, which forwards the order to the cooking staff that is responsible for preparing the order. When the cooking or bar staff finishes their portion of the order, they inform the central server that the order is complete, which will send a message to the waiter that the order is ready to be served. In conjunction with this process, the central server monitors the orders taken and make intelligent decisions, such as instructing the cooking staff to prepare the orders in the most efficient and timely sequence. The central server memory can also be accessed by the kitchen unit to access a help section containing directions on how to prepare a meal or a list of recipes.

The cleanup communication unit 17 (FIG. 2) generally consists of a low cost standard type pager 58, or similar type device, or there could be a "table clean" code available on the Table Unit. This unit or feature will be used by the cleanup team members to inform the central server unit, which tables have been cleaned and are ready for customers. Once the central server unit receives the table clean signal, it logs the completion time to be used for future statistical information. It also identifies the table on the hostesses unit as being ready for customers.

The system also will be scaleable to meet different business needs. For instance, some restaurants might opt to buy only the Waiter Unit and Kitchen Unit portion of the system. In this instance the table unit portion of the system will be disabled but available as an add on at a latter date. The components will also be scaleable. For instance, the Table Unit could be a touch screen that displays advertisements or it could be a simple button that calls the waiter, and/or the waiter unit could be hand held computer like a Palm Pilot or can be a beeper that signals the waiter that food is ready to serve, or that a table needs service.

Similarly, the system components can be stand-alone units that communicate directly with one another, i.e., from the table unit directly to the waiter unit, such as through an RF, infrared or similar communications link without requiring the central server to process and route communications.

As illustrated in FIGS. 7A–9, which disclose the various operational sequences of the present invention, in the operation of the communication system of the present invention in a restaurant during normal operation, the hostess unit will display the restaurant layout to indicate the status of various tables, i.e., in use, being cleaned, ready for seating, or reserved. The central server unit can use statistical data gathered from the restaurant on a daily basis to also display an estimate of the time until a table will be available. When the table becomes available, that information will be displayed on the screen of the hostess unit. This information can be further used to generate estimated wait times for display on the hostess unit and on an Internet website. Initially, when customers enter the restaurant, they are logged into the system, as indicated by step 100. In step 101, the start of their wait time in the lobby of the restaurant is also logged in. Thereafter in step 102, the main computer will check to see if wait time is excessive, typically based upon a predetermined or desired wait time, or based on statistical information as to what the wait time would typically be for the restaurant at that given time period and for a given day of the week. If wait time is excessive, a signal is sent to the manager unit, setting off an alarm at 103, and the excessive wait time is logged into the central server or main computer at 104. If the wait time is not excessive, the main computer at step 107 determines if a table is available, and if not, continues to poll the wait time, as shown in step 102. If a table is available, this information is displayed on the hostess unit at 106, after which the hostess will seat the customer and enter the fact that the table is busy or that a customer has been seated, in step 108. Thereafter, the customer is cleared from the lobby wait list in step 109, and the overall wait time for the customer is entered into the system database in step 111. Thereafter, a waiter unit 14 for the particular table is signaled in step 112 that a new customer has been seated so that the waiter can then proceed to the table.

In step 113 (FIG. 7B), the waiter takes an order from the customer and enters it into the waiter unit, whereupon the order is sent to the central server unit or main computer. In step 114, the order is processed to determine if the requested food item(s) is/are available and if not, the customer is informed in step 116 that the item is available. If the requested food item(s) is available, the time that the order is entered in the kitchen is logged in step 117 and is displayed/printed for the cooks, including being displayed in separate food preparation areas, i.e., drinks, cooked foods, salad, etc., in step 118. Thereafter, in step 119, the system checks to see if the order processing or wait time is excessive and if so, send a warning call to the waiter of a delay in step 121, after which the waiter is typically charged with taking some action within a desired time, in step 122, to satisfy a customer request or otherwise placate the customer. If so, In step 123, the order is checked to see if it is completed, and if not, the wait time is again polled. If the customer request is not satisfied within the predetermined time, an alarm message is sent to a manager unit to inform the manager of the situation so that they can take action to placate the customer as much as possible and head off a potential customer problem. Once the order is completed, a signal is sent that the order is ready to serve, in step 126, after which the main computer logs the serve time that the order has been completed by the kitchen. The system then checks to see if the table's waiter is busy in step 128, and if so, the order is passed to a manager or an available waiter in step 129. If the waiter is not busy, the signal is sent to the waiter unit that displays a message in step 131 that the order for a certain table number is ready. The system then typically checks in steps in step 132 to see if the wait time for the service of the order has been excessive, and if so, sends a message to the manager in step 133, after which in step 134 the late service time data is logged into the central server unit. If the wait time has not been excessive, the system then checks in step 136 to see if the order has been served, and if not, continues to poll the service wait time. If the order has been served, the service order is cleared from the waiter unit, typically by the waiter pressing a cancel or delete key on his waiter unit, and the completion time for the order is logged in the central server unit in step 138.

As shown in FIG., 7C, simultaneously with the processing of the customer orders, the table unit 12 at each table typically will display advertisements, menu specials, or can include games such as trivia, etc., to entertain the customers while they are waiting for the processing of their orders, as indicated by step 140. In addition, the customers can input requests for service directly into the table unit for substantially direct communication of such request to their waiter and/or a manager to enable closer, more direct contact between the restaurant management and wait staff and their customers.

Figure 7A:
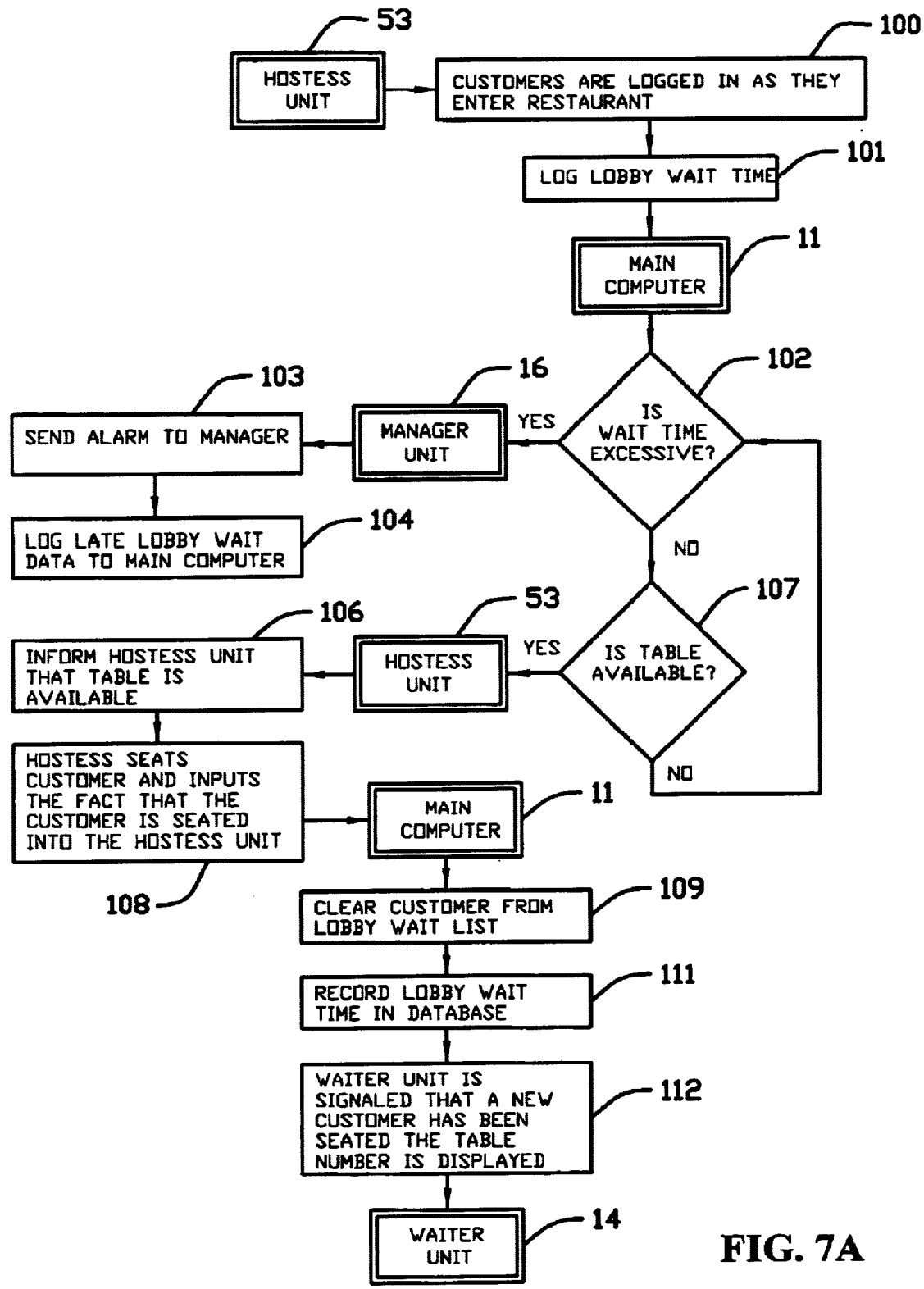
FIGS. 7A–F are flowcharts schematically representing the operation of the restaurant service communication system of the present invention in the first method of operation.
Figure 7B:
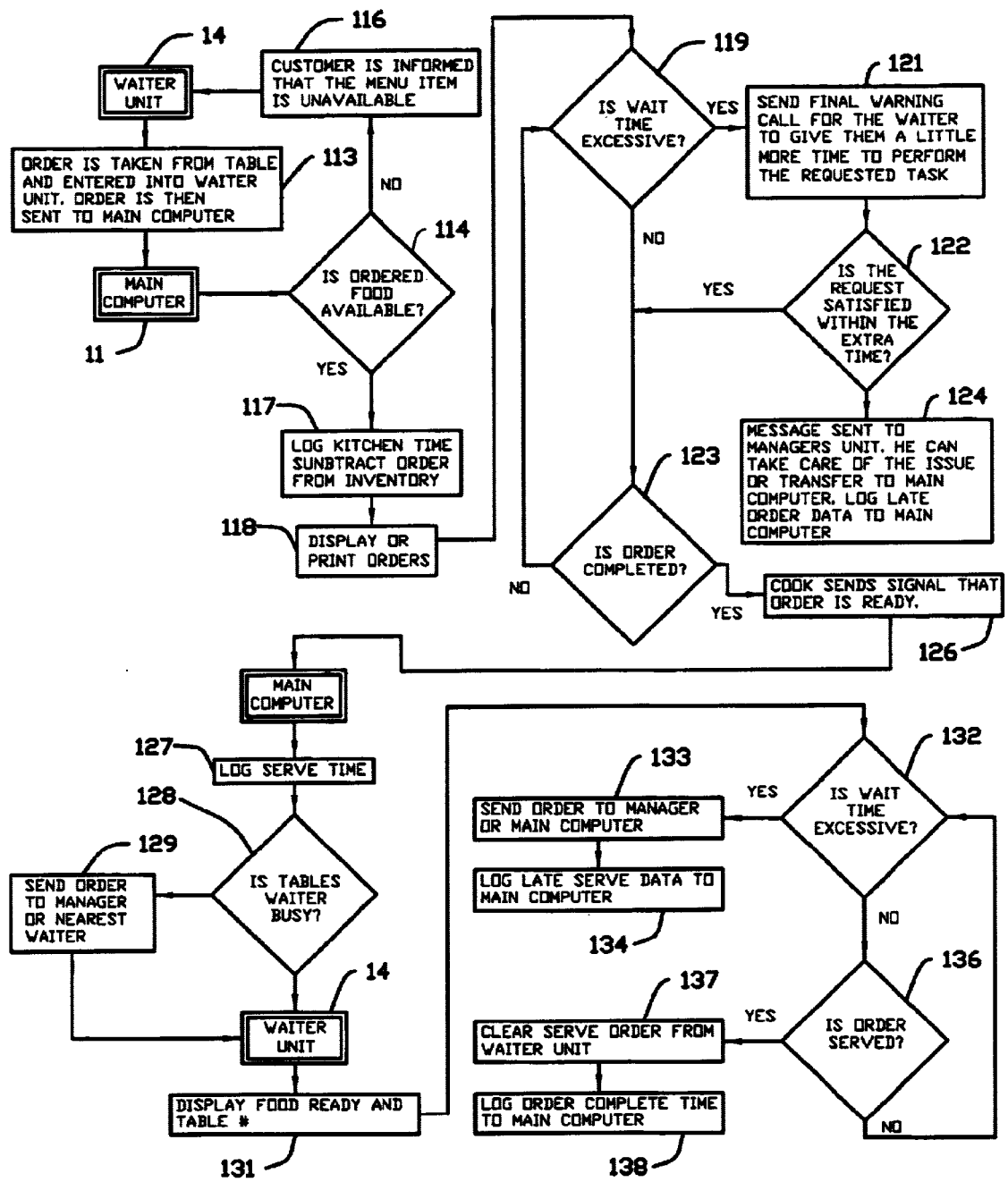
Figure 7C:
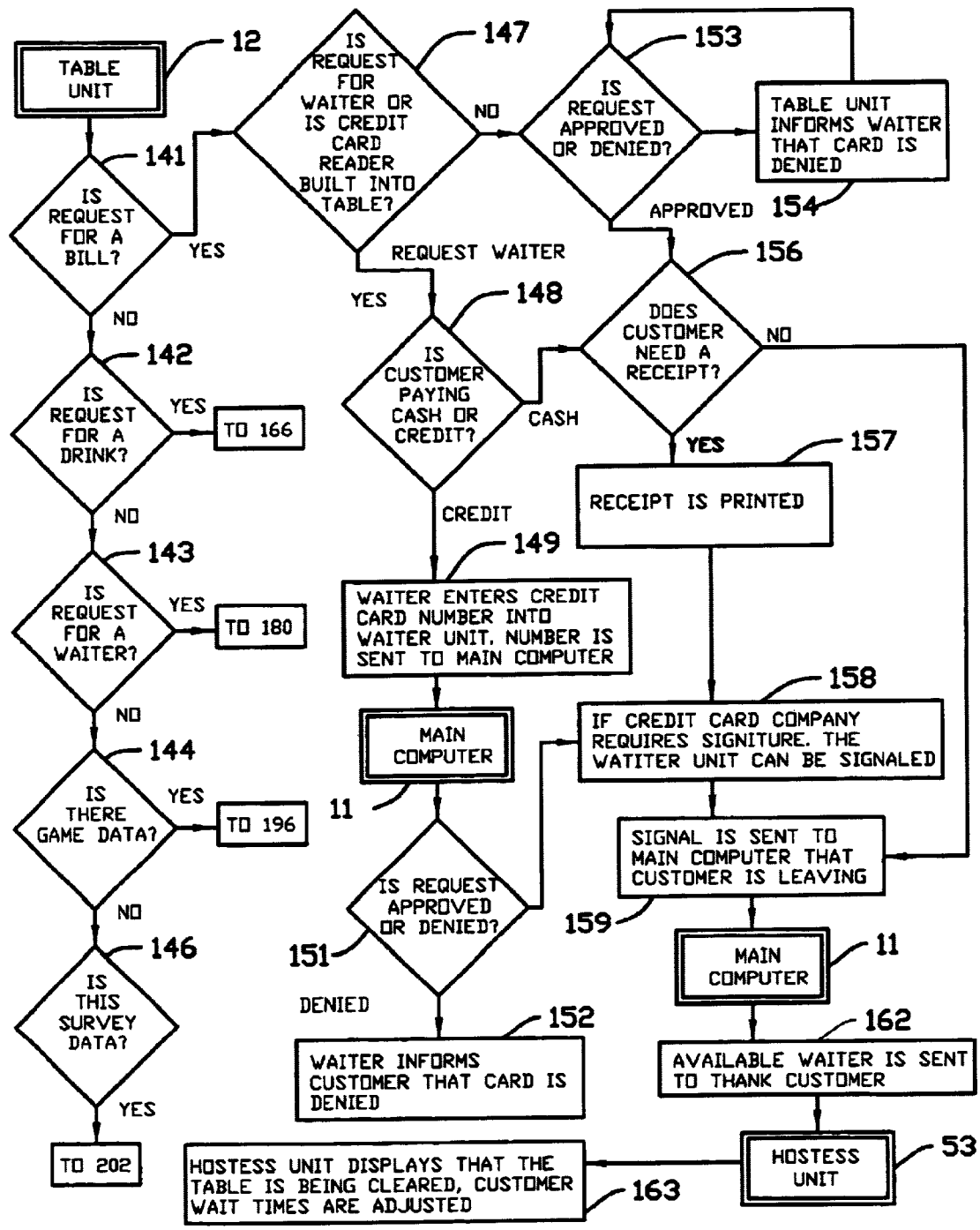
Figure 7D:
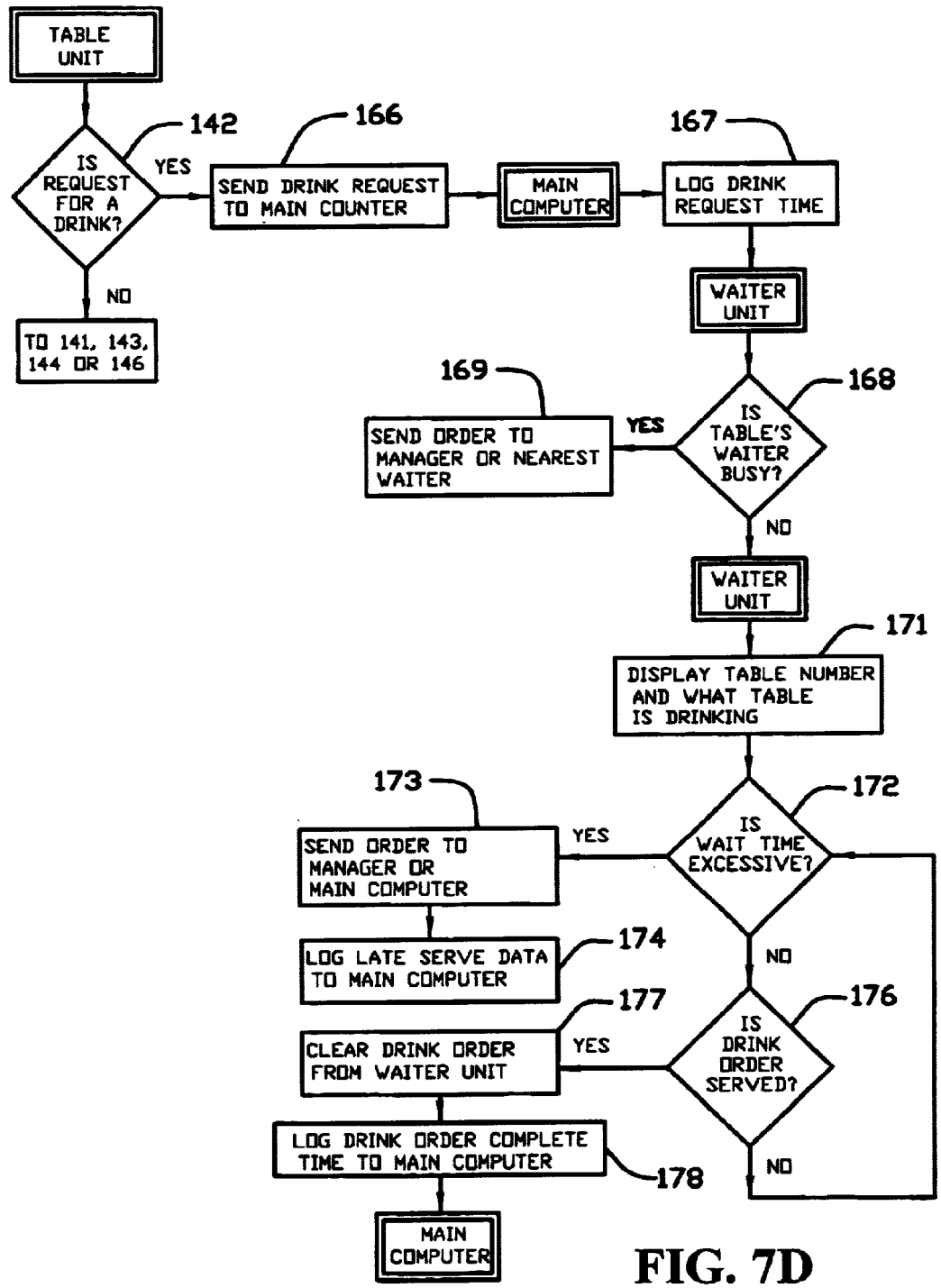

As FIG. 7C illustrates, when a request is logged into the table unit 12, the system initially checks in step 141 to see if the request is for a bill, and if not, checks in step 142 to see if the request is for a drink, for a waiter (shown in step 143), whether the customer is simply inputting game data in step 144, or whether the customer is simply entering survey data. Depending upon which of these functions are selected, their sequence of operation is illustrated in FIGS. 7C–7F.

Referring now to FIG. 7C, if the customer's request in step 141 is for a bill, a request is initially processed in step 147 to determine whether the waiter is requested to bring the bill or whether the customer will be using the credit card reader built into the table unit. If the customer requests the waiter, the system then checks in step 148 to see if the customer is paying cash or credit and if the customer is paying by credit, the waiter will enter the customer's card number into his waiter unit and transmit it to the central server/main computer in step 149. The central server then checks to see if the card is approved or denied in step 151, and if it is denied, the waiter will inform the customer in step 152 to make other arrangements for payment of the bill.

Similarly, if the customer uses the credit card unit built into the table unit, the system will check in step 153 to see if the card is approved or denied. If it is denied, the table unit will inform the customer and give the customer the choice of trying an other card or calling a waiter in step 154. If the card is approved, or the customer is paying by cash, the system proceeds to step 156 to check to see if the customer needs a receipt. If so, in step 157, a receipt can be printed at an optional table unit printer, or printed at a central printer for delivery by the waiter in step 157. In addition, if a credit card is being used that requires a signature , the waiter unit itself can be signed in step 158 to provide an electronic signature for the card. Thereafter, if the customer has not needed a receipt and/or once the credit card voucher has been signed by the customer, the waiter unit sends a signal in step 159 to the main computer/central server that the customer is leaving. The central server processes this request to determine first in step 162 to see if the table's waiter is free and thereafter a signal is sent in step 163 to the hostess unit 53, to indicate that the table is to be cleaned so that customer wait times can be adjusted to indicate a table coming free. At the same time, the central server unit sends a signal to start a cleaning operation as illustrated in FIG. 8.

Figure 7E:
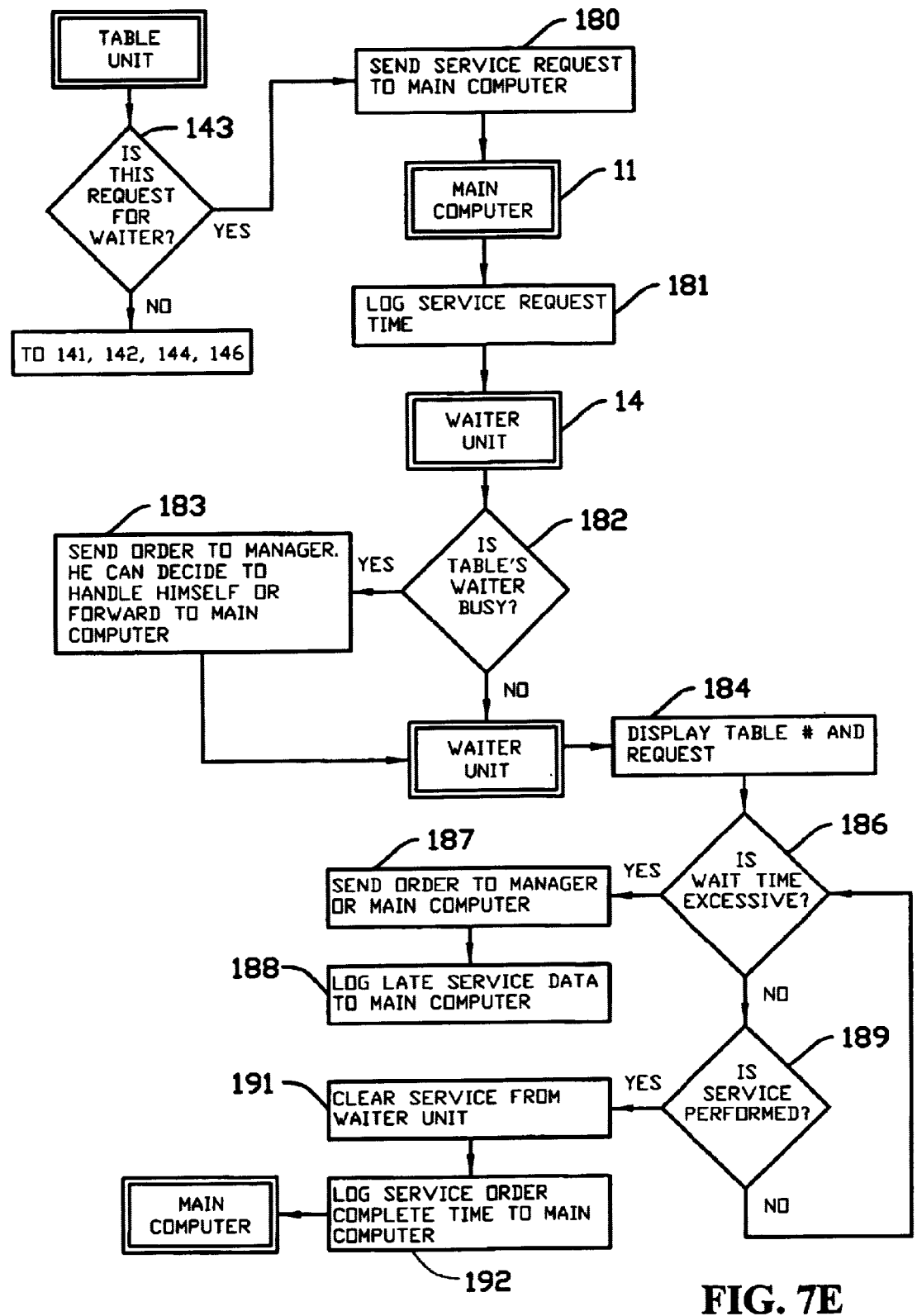
Figure 7F:
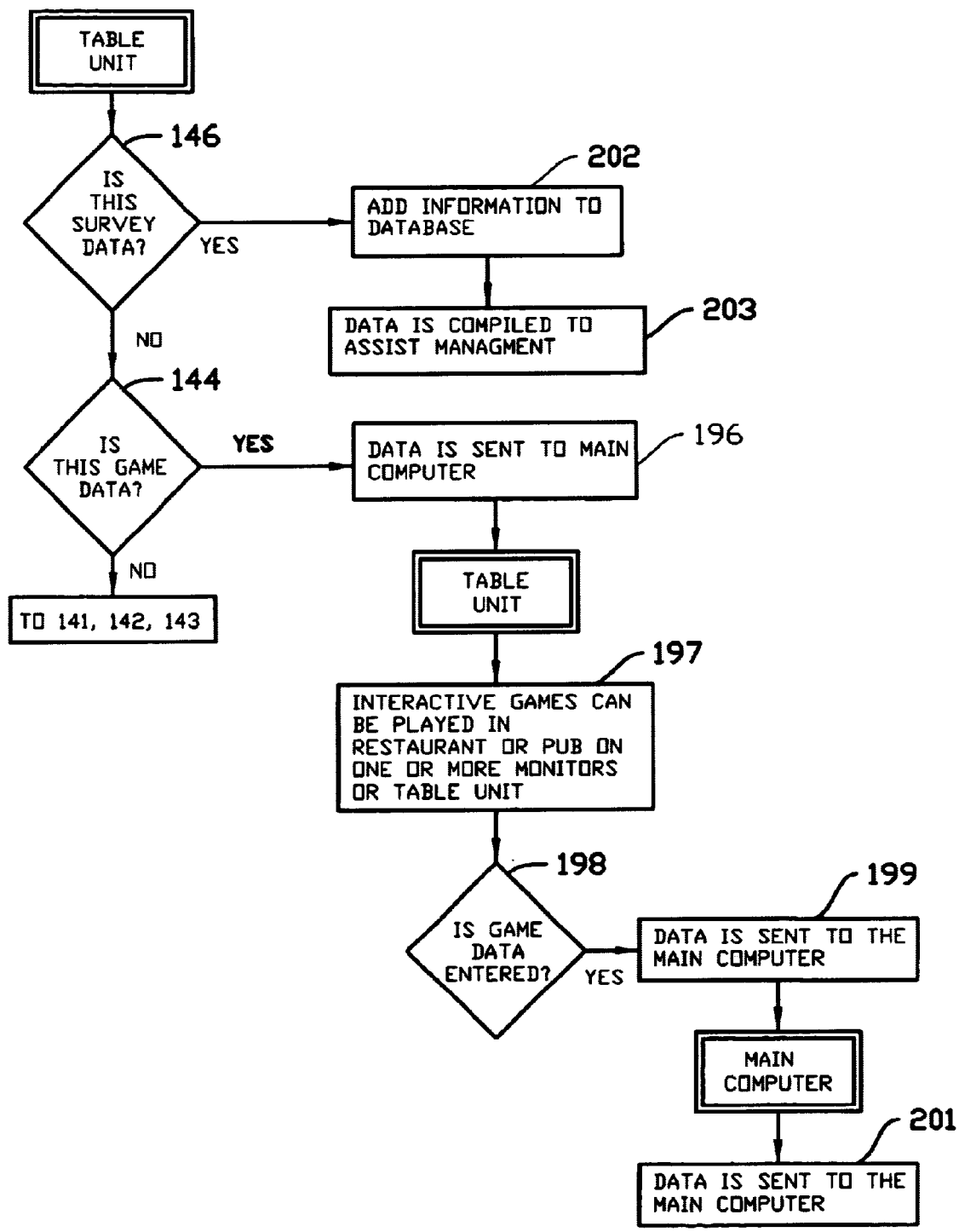

As shown in FIG. 7E, if the customer request in step 143 has been for a waiter, the service request is sent in step 180 to the main computer or central server which then logs in the entry time of the service request in step 181. The waiter unit for that table is then signaled and the system checks in step 182 to see if the waiter is busy. If so, the system in step 183 will send a request to a manager who can either take care of the request himself, or send the request to an available nearby waiter. If the table's waiter is not busy, his unit will display the table number and request in step 184, and thereafter the system will check in step 186 to see if wait time between the logging in of the service request and response by the waiter is excessive. If so, a signal can be sent to a manager in step 187 or to the main computer and the service delay will be logged into the main computer in step 188. If the wait time has not been excessive, the system will check in step 189 to see if service has been completed. If so, it will enable the service request to be cleared from the waiter unit in step 191. If the service has not been performed in step 189, the system again checks to see if wait time has been excessive.

uuu. 7F, if the request from the table unit is game data as indicated in step 144, this data is sent to the main computer in step 196 which communicates with the table unit to enable interactive games to be played such as trivia, etc., as shown in step 197. The system will then enter game data in step 198 and process it through the main computer or central server unit in step 199, with the central server unit calculating customer entry results or scores and sending it back to the table unit in step 201. Similarly, if the request is part of survey data in step 146, survey information and questions are displayed on the table unit and responses are entered into a database in step 202 from which data is compiled by the central server unit to enable management to combine real time and statistical data in step 203 for inventory control and tracking of service such as wait times, etc., which further information also can be posted to a restaurant Internet website.

Figure 8:
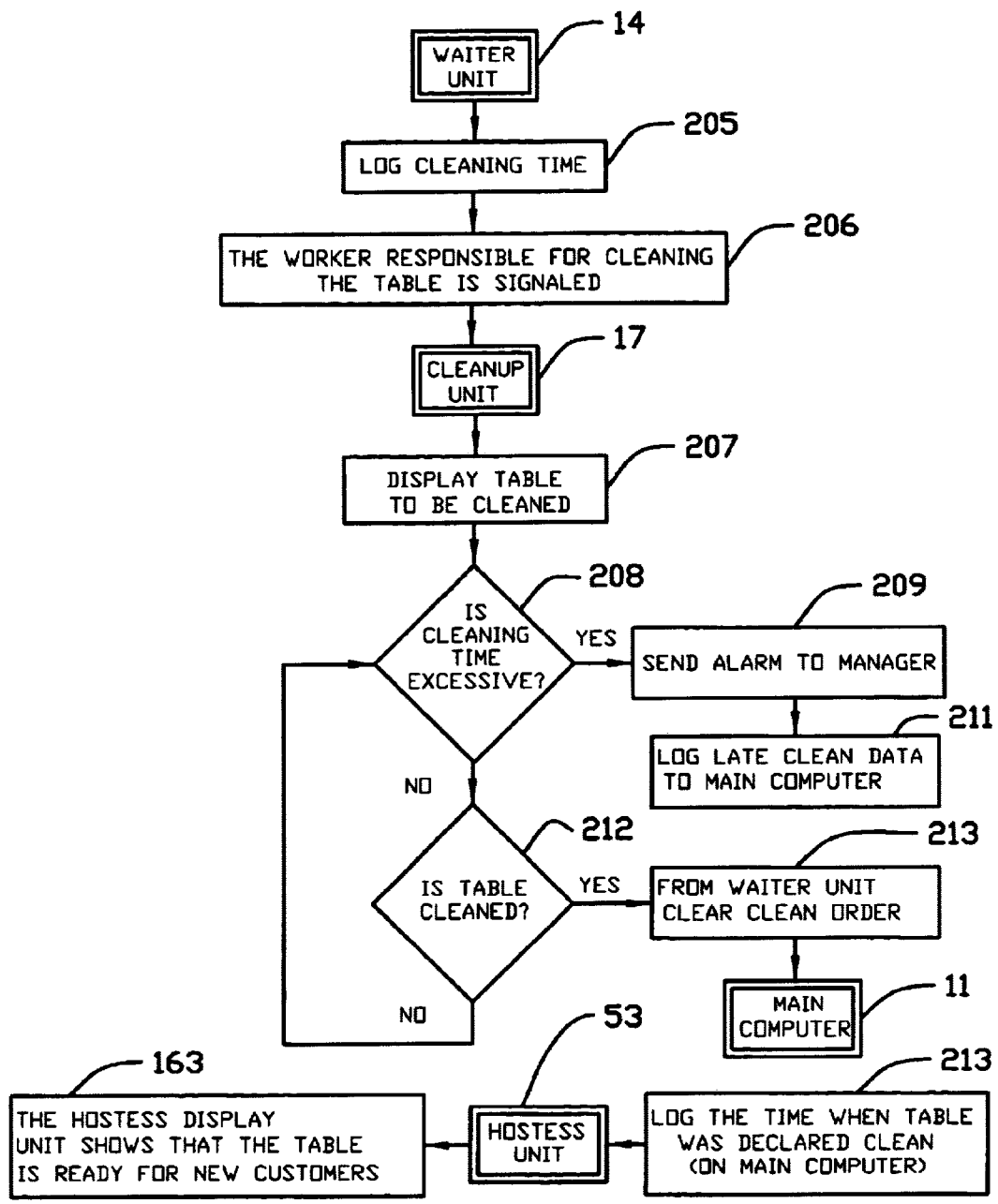
FIG. 8 is a flow chart schematically illustrating the function of the present system or log cleaning time of a table.

FIG. 8 illustrates a sequence of operation for a cleanup operation in which a waiter unit 14 logs in a cleaning time and request in step 205, typically after the customer has left the table. A signal is then sent in step 206 to a cleanup worker responsible for clearing that table through his cleanup unit. The unit will display the table to be cleaned and at the same time, the system will monitor or check the cleaning time in step 208 to see if it is progressing or if it is excessive. If the cleaning time reaches a point where it is believed to be excessive, a signal is sent in step 209 to alert a manager and the delay is logged into the central server or main computer in step 211. If cleaning time has not been excessive, the system checks to see if the table is being cleaned in step 212, and if not, continues to check the delay time to see if it reaches an unacceptable level in step 208. If the table has been cleaned, a signal is sent to the waiter unit for that table to clear the clean order in step 213, which signal is then forwarded to the main computer or central server unit, which logs in the time that the table was declared clean in step 213, and in response sends a response to hostess unit 53 to indicate that the table is ready for new customers as shown in step 163.

Figure 9:
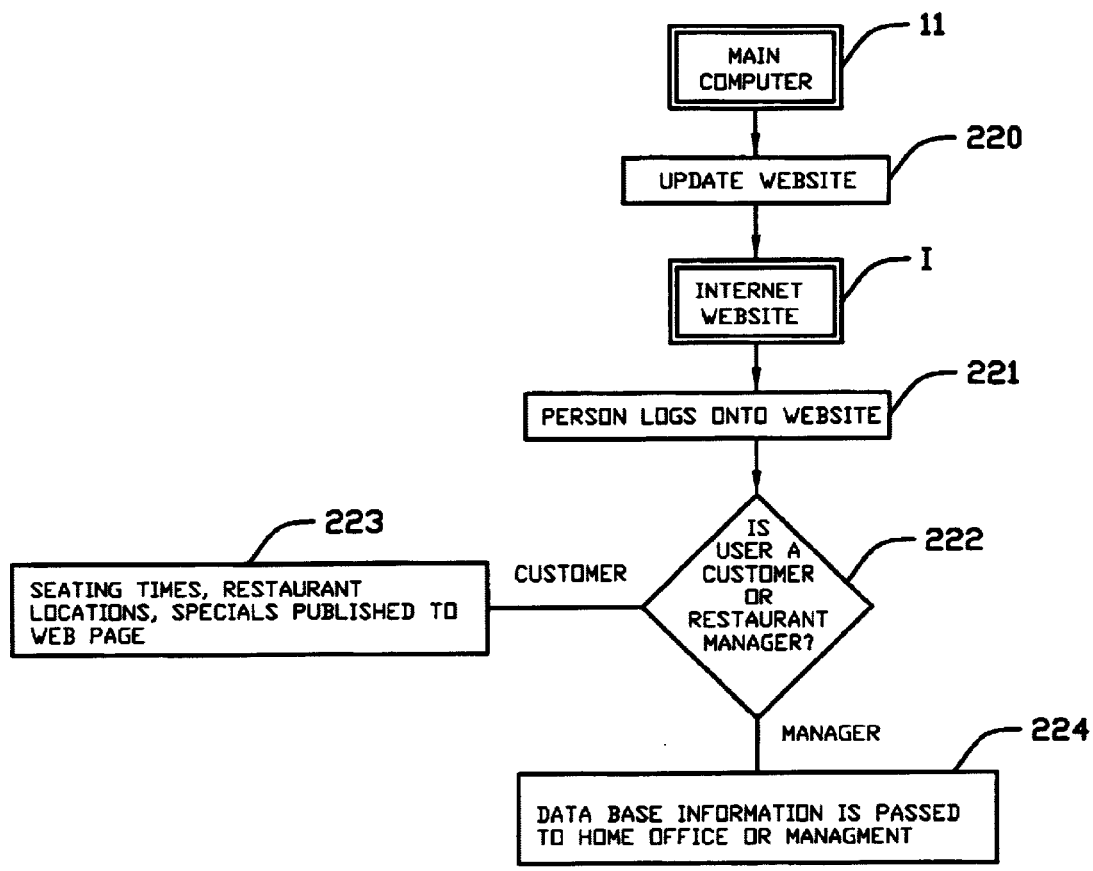
FIG. 9 is a flow chart schematically illustrating the posting and updating of information concerning seating availability and wait times for the restaurant in an Internet web site.

FIG. 9 illustrates the updating of the Internet website for the restaurant in which the main computer or central server unit 11 sends a signal in step 220 to update the restaurant website "I". Thereafter, as persons log onto the website in step 221, the user is asked in step 222 whether they are a customer or a manager. If the user is a customer, they are directed to information about seating availability and wait times in step 223, which site page can also provide directions, enable reservations to be made online, and display discounts and/or specials. If the user logging into the site is a manager, in step 224, the manager can log into the statistical database being compiled in the main computer or central server unit through an encryption or code key. Such information can be then viewed and downloaded by a home office or manager at a remote server/site to check restaurant wait times, business, and employee performance. The data further can be organized or categorized to enable quick access to the most requested data such as employee performance or customer complaints, etc.

It will be understood by those skilled in the art that while the invention has been disclosed with reference to preferred embodiments, various modifications, additions and changes can be made thereto without departing from the spirit and scope of the invention as set forth in the following claims.

What is claimed is:

1. A restaurant communication system to enhance communications between the restaurant wait staff and customers, comprising:

an interactive table unit at a customer table, an interactive table unit including a data input device, display, and a communication device, an interactive table unit at a customer table for receiving customer requests for service and communicating such customer requests to a central server unit and at least one selected wait staff unit;

said at least one wait staff unit carried by a server and including a request and display device and a communication mechanism for communicating with said central server unit and receiving customer requests for service;

said central server unit including a timing element monitoring the wait time, the wait time is being defined as time elapsed between the time a customer request call comes in, and a time when the customer request call is addressed by the wait staff, and wherein said central server unit notifies a second wait staff unit or a manager unit if the wait time exceeds a predetermined wait time.

2. The restaurant communication system of claim 1 and wherein said table unit includes a power supply.

3. The restaurant communication system of claim 1 and wherein said data input and display mechanism of said table and waiter units includes a touch screen, key pad, and/or stylus.

4. The restaurant communication system of claim 1 and where in said communication mechanism of said table and waiter units comprise a transmitter and receiver.

5. The restaurant communication system of claim 1 and wherein said central server unit comprises a central processor unit, memory storage, transmitter and receiver, and a data input and display device.

6. The restaurant communication system of claim 1 and further including a kitchen unit having a display monitor for receiving and displaying customer order information at the restaurant kitchen and a communication unit to communicate with a waiter unit.

7. The restaurant communication system of claim 1 and wherein said waiter unit comprises a pager.

8. The restaurant communication system of claim 1 and further including a hostess unit having a data input device for entering customer profiles designed to build a profile database, tailor and direct customer advertisements, and for receiving and displaying seating times.

* * * * *